United States Patent
Nakata

(10) Patent No.: US 6,541,703 B2
(45) Date of Patent: Apr. 1, 2003

(54) GROMMET

(75) Inventor: Hiroyuki Nakata, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/805,045

(22) Filed: Mar. 14, 2001

(65) Prior Publication Data

US 2001/0023773 A1 Sep. 27, 2001

(30) Foreign Application Priority Data

Mar. 15, 2000 (JP) ........................................ 2000-072084

(51) Int. Cl.[7] .................................................. H02G 3/18
(52) U.S. Cl. ................................ 174/65 G; 174/152 G; 174/153 G; 16/2.1; 248/56
(58) Field of Search ...................... 174/65 G, 152 G, 174/153 G, 665 S, 151, 135, 65 R; 16/2.1, 2.2; 248/56

(56) References Cited

U.S. PATENT DOCUMENTS

| | | | | | |
|---|---|---|---|---|---|
| 4,797,513 | A | * | 1/1989 | Ono et al. ............... | 174/153 G |
| 5,448,017 | A | | 9/1995 | Nakajima et al. | |
| 5,453,579 | A | * | 9/1995 | Cohea .................... | 174/153 G |
| 5,526,549 | A | | 6/1996 | Mori et al. | |
| 5,531,459 | A | * | 7/1996 | Fukuda et al. ......... | 174/152 G X |
| 5,635,678 | A | * | 6/1997 | Yasukuni ................ | 174/152 G |
| 5,732,440 | A | * | 3/1998 | Wright ................... | 16/2.2 |
| 5,736,677 | A | * | 4/1998 | Sato et al. .............. | 174/65 G |
| 5,739,475 | A | * | 4/1998 | Fujisawa et al. ........ | 248/56 X |
| 5,856,635 | A | * | 1/1999 | Fujisawa et al. ........ | 174/153 G |
| 5,981,877 | A | * | 11/1999 | Sakata et al. ........... | 174/153 G |
| 6,051,795 | A | * | 4/2000 | Fisher et al. ............ | 174/153 G |
| 6,088,874 | A | * | 7/2000 | Nakata et al. .......... | 16/2.1 |
| 6,088,875 | A | * | 7/2000 | Ono et al. ............... | 16/2.2 |
| 6,211,464 | B1 | * | 4/2001 | Mochizuki et al. ..... | 174/65 G |
| 6,339,196 | B1 | * | 1/2002 | Uchida .................... | 174/153 G |
| 6,353,185 | B1 | * | 3/2002 | Sakata ..................... | 174/65 G |
| 6,402,155 | B2 | * | 6/2002 | Sakata ..................... | 16/2.2 X |

FOREIGN PATENT DOCUMENTS

| JP | 60116481 | 8/1985 |
|---|---|---|
| JP | 62-56685 | 3/1987 |
| JP | 63108122 | 7/1988 |

* cited by examiner

*Primary Examiner*—Dean A. Reichard
*Assistant Examiner*—Dhiru R Patel
(74) *Attorney, Agent, or Firm*—Greenblum & Bernstein, P.L.C.

(57) ABSTRACT

A grommet is provided with a circumferential channel around its outer surface serving to hold an automobile body panel, thereby forming a circumferential channel base and first and second channel walls extending outwardly therefrom. The circumferential channel also forms corresponding first and second circumferential edges at respective outermost portions of the first and second channel walls. Further, the first circumferential edge extends farther outwardly than the second circumferential edge in a radial direction of the grommet, and has a flat edge in the same direction so as to hold the car's body panel. The first and second walls become closer as they extend from the channel base, such that the first circumferential edge overlaps the second circumferential edge in a longitudinal direction of the grommet. Further, the portion of first channel wall facing the second circumferential edge is grooved so as to form a circumferential groove along the second circumferential edge and open towards the channel, whereby the minimum distance between the first and second channel walls can be set to be above a predetermined value. When the outwardly narrowing channel in the grommet has such a configuration, a die used for molding such a grommet can be made highly durable.

14 Claims, 4 Drawing Sheets

GROMMET

BACKGROUND OF THE INVENTION

1. Field of the Invention

The present invention generally pertains to a grommet for preventing water and dust penetration. Such a grommet may be fitted onto a wire harness installed in vehicles, e.g. automobiles. The grommet is then mounted into a hole that is formed by boring into a car body made of, e.g., a steel panel. Such a grommet is usually made of an elastic material.

2. Description of Background Information

Known grommets are formed of a rubber or an elastomeric material. As shown in FIG. 1, such a grommet includes, along its longitudinal axis, a small cylindrical portion $1a$, through which a wire harness passes in an airtight condition; a large cylindrical portion $1b$ having a thick endwall $1c$; and an intermediate cylindrical portion gradually flaring from one end of the small cylindrical portion $1a$ and reaching one end of the large cylindrical portion. The grommet also includes a snap fitting peripheral engagement channel $1d$ which is grooved in the outer circumferential surface between the intermediate cylindrical portion and the large cylindrical portion $1b$ having a thick endwall $1c$. When the grommet together with a wire harness is inserted into a hole made in a car's body panel, the circumferential engagement channel $1d$ engages with the peripheral rim of the hole and thus attaches onto the car's body panel.

The engagement channel $1d$ of the grommet 1 includes a first channel wall $1d$-1 and a second channel wall $1d$-2. The car body panel 2 is bored with a hole $2a$ adapted to the grommet. The rim zone of the hole $2a$ thus includes a first face $2b$ and a second face $2c$. The first and second channel walls $1d$-1 and $1d$-2 are closely fitted with the respective first and second faces $2b$ and $2c$ of the car's body panel 2, thus preventing the passage of water and dust through the hole.

A car's body panel, to which is applied a grommet, is usually rather thin. To achieve good sealing with such a panel, the first channel wall and the second channel wall are to be brought closer together the farther they extend radially from the common cylindrical axis. FIG. 2 shows a first slanted channel wall $1d'$-1 and a second slanted channel wall $1d'$-2 formed as explained above. The first and second slanted channel walls respectively form a first circumferential edge $1e'$ and a second circumferential edge $1f'$, which hold the inserted body panel portion from opposite sides.

FIG. 3 shows an example of a die from which such an engagement channel is molded. As can be seen in this figure, the portion of the die adjacent the first slanted channel wall $1d$-1' and the second circumferential edge If is rendered very thin, and forms a neck portion $5a$. The neck portion $5a$ then widens toward a channel base $5b$ of the snap fitting engagement channel $1d$. A grommet to be applied to a 1 mm thick body panel, for instance, may include a neck portion $5a$ having an opening (L1) of 0.5 mm, and a radial distance (H) of 4 mm, as measured from the channel base $5b$.

However, when a grommet contains such a "thin-top, wide-base" channel configuration, the dies that are configured complementarily thereto become very susceptible to breakage, incurring a very short die lifetime.

SUMMARY OF THE INVENTION

In view of the above, a main object of the invention is to provide a grommet which can be produced without using such dies having a considerably narrowed neck portion. The grommet thus produced can nonetheless provide circumferential edge portions which hermetically fit with a panel material.

To this end, there is provided a grommet made of elastic material having longitudinal and radial directions. The grommet includes at least a cylindrical portion and a cylindrical end portion with a thick wall, arranged along the longitudinal direction, and is adapted to fit onto a wire harness and to be mounted into a substantially circumferential rim surrounding a hole bored through a panel material.

The grommet of the invention includes a circumferential channel on the outer circumferential surface between the cylindrical portion and the cylindrical end portion having a thick wall, such that the circumferential channel forms a channel base, and first and second channel walls extending substantially radially therefrom. Further, the first and second channel walls respectively form first and second circumferential edges at the radially outermost portions thereof, whereby the former is located radially more outwardly than the latter.

The first and second channel walls are configured such that the first circumferential edge projects beyond the second circumferential edge in the longitudinal direction and the minimum distance between the first channel wall and the second channel wall in the longitudinal direction can be maintained above a predetermined value.

Preferably, the first channel wall includes a circumferential channel extending along the second circumferential edge, and the first and second channel walls are configured, such that they are brought closer together as they extend outwardly and substantially radially from the channel base.

According to a further aspect of the invention, the first and second channel walls may be configured such that the first channel wall is bent at a flex point near the second circumferential edge, whereby the first channel wall extends, up to the flex point, in parallel relation to the second channel wall while inclining towards the cylindrical end portion in the longitudinal direction, and the first channel wall then inclines toward the second circumferential edge from the flex point onwards.

According to a further aspect of the invention, the first circumferential edge may include a flat edge in parallel relation with the radial direction, so as to hold the panel material.

Typically, the minimum distance between the first and second channel walls in the longitudinal direction is about 1 mm, when the panel material is about 1 mm thick.

The portion of the first channel wall near the second circumferential edge, where the distance between the two walls is the smallest, is preferably provided with a groove having a semicircumferential cross-section, so that the above distance is advantageously made greater. Accordingly, the width of the corresponding member in the molding die can also be made greater. As a result, the dies can enjoy a longer service life. Moreover, although the first channel wall is grooved, the first circumferential edge overlaps with the second circumferential edge in the longitudinal direction. Further, the first circumferential edge has a flat edge so as to yield a larger adhering surface, to which a panel material, e. g., a car's body panel, abuts. By virtue of this specific configuration, sealing quality is not impeded, even though the channel surface is reduced.

In a typical case, the first channel wall forms a channel section flexing at a predetermined position, up to which the first and second channel walls extend in parallel relation to each other, while keeping a constant width without including any unacceptably narrowed position. An advantage of having such a channel structure is that the dies designed for molding such a channel structure can secure a longer service life. The portion of the first channel wall located above the flexing position is inclined towards the second circumferential edge and overlapped therewith in the longitudinal direction. Moreover, the tip of the first circumferential edge is made flat, so that it can have a larger contact face for holding the panel material. The sealing quality of the grommet can thus be maintained.

BRIEF DESCRIPTION OF THE DRAWINGS

The above, and the other objects, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

Figure 1:
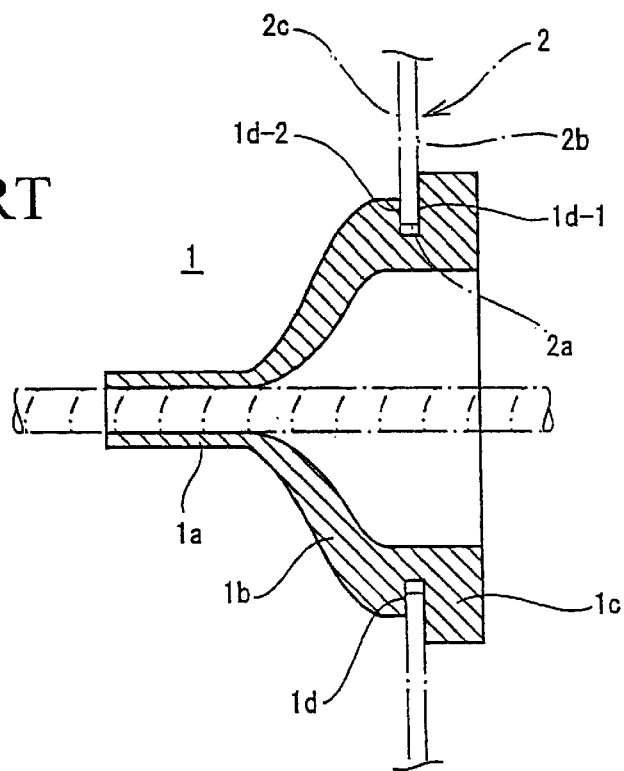
FIG. 1 is a side sectional view of a prior art grommet.
Figure 2:
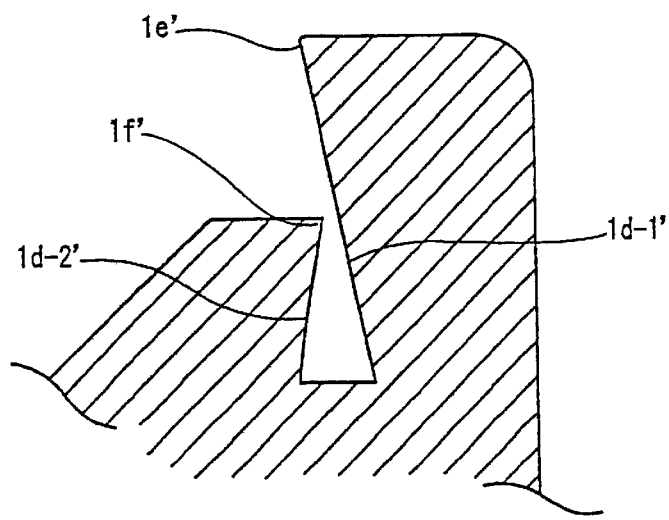
FIG. 2 is a schematic side sectional view of another prior art grommet.
Figure 3:
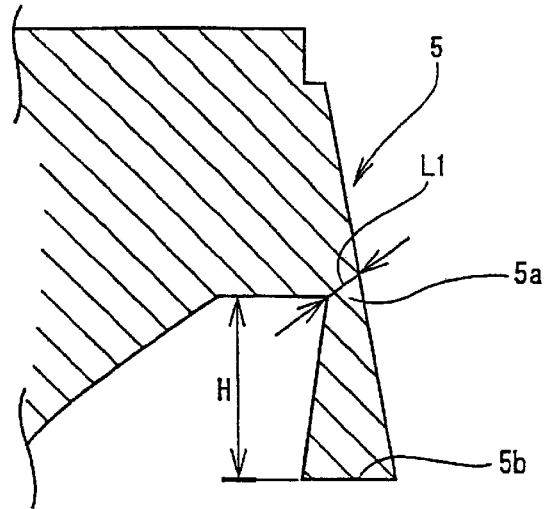
FIG. 3 is a partial cross-sectional view of a die used for molding the grommet of FIG. 2.
Figure 4:
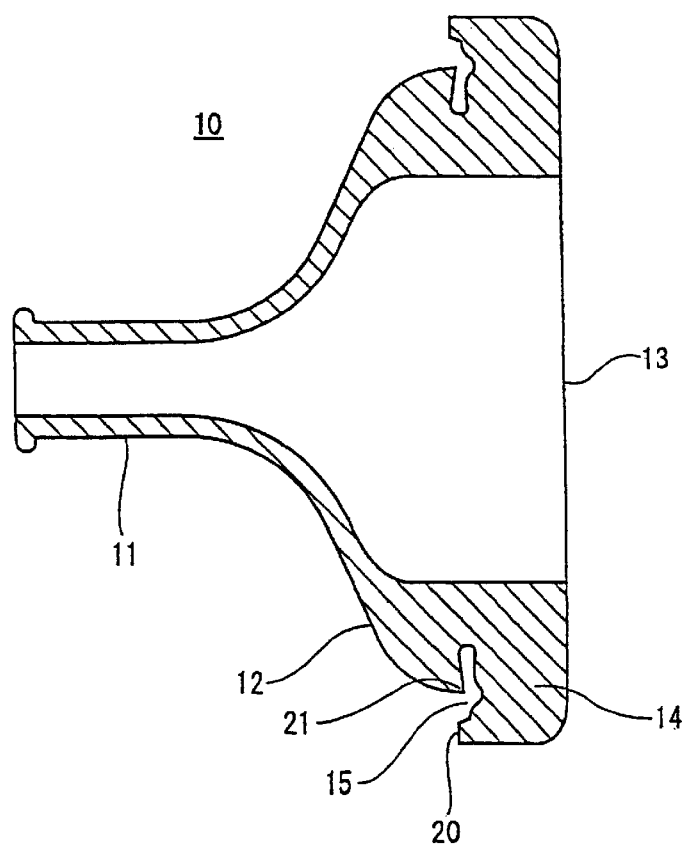
FIG. 4 is a side sectional view of a grommet according to a first embodiment of the invention.
Figure 5:
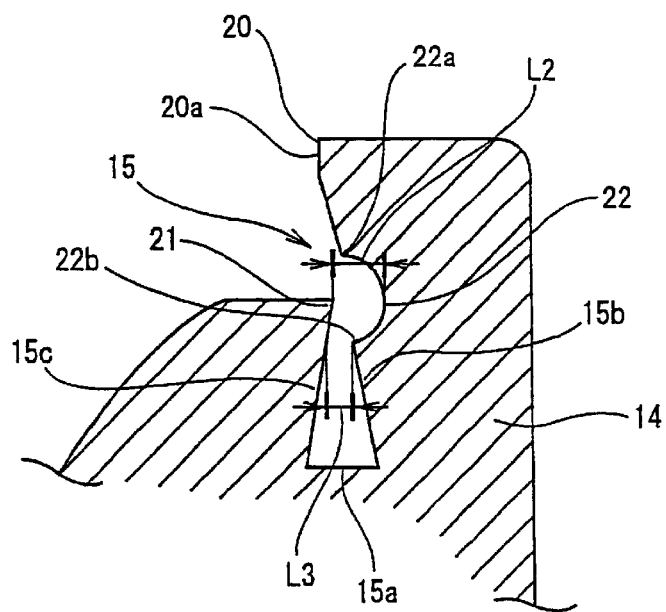
FIG. 5 is an enlarged sectional view of a relevant part of the grommet of FIG. 4.
Figure 6:
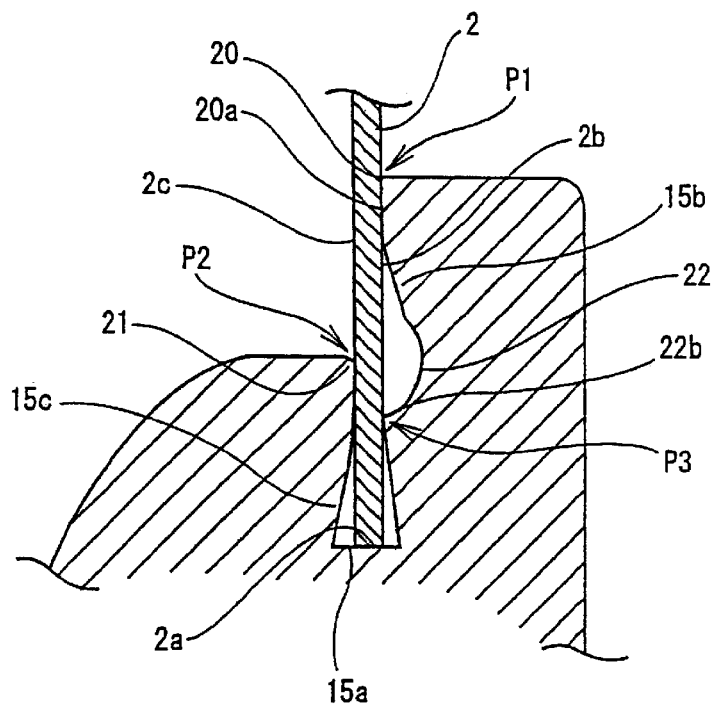
FIG. 6 is the same view as FIG. 5, when a panel material is fitted with the grommet of FIG. 4.

FIGS. 4 to 6 show a grommet 10 according to a first embodiment of the invention. The grommet 10 of the invention may be formed unitarily and in one piece of any suitable material, for example, of a rubber or an elastomer material, and may be applied to an automobile body panel of about 1 mm thick. The grommet 10 includes a small cylindrical portion 11 through which a wire harness is passed and kept with an airtight fit. The grommet 10 further includes a large cylindrical portion 12 joined to one end of the small cylindrical portion 11 through an intermediate cylindrical portion. The intermediate cylindrical portion therefore enlarges continuously from one end of the small cylindrical portion 11 in the radial direction, and joins with one end of the large cylindrical portion 12. The large cylindrical portion 12 has an opening 13 at the other end. The large cylindrical portion 12 surrounding the opening 13 includes a thick wall 14 with respect to the other portion of the cylindrical walls. The outer cylindrical surface of the grommet, which separates the intermediate cylindrical portion from the large cylindrical portion 12 having a thick wall 14, is grooved into a circumferential channel 15. When the grommet 10 is inserted into a hole 2a bored through a panel material 2, the peripheral rim portion of the hole 2a fits into the circumferential channel 15.

The circumferential channel 15 has a channel base 15a, a first channel wall 15b and a second channel wall 15c. The first and second channel walls 15b and 15c face each other across the channel base 15a and are brought closer together towards the open side of the circumferential channel 15 (FIGS. 5 and 6). The first channel wall 15b, located closer to the opening 13 of the grommet 10 than the second channel wall 15c, extends outwardly further than the latter. The first and second channel walls 15b and 15c respectively include a first circumferential edge 20 and a second circumferential edge 21. The first and second circumferential edges 20 and 21 face each other at the outermost portions of both sides of the circumferential channel 15, in such a way that they overlap in a longitudinal direction of the grommet 10 but are spaced from each other in a radial direction thereof.

As the first channel wall 15b and the second channel wall 15c are inclined in an outwardly closing configuration, the second circumferential edge 21 normally would be the portion of the second channel wall 15c closest to the first channel wall 15b. However, the inside face portion of the first channel wall 15b which faces the second circumferential edge 21 is provided with a groove 22 having a semicircumferential cross-section. This groove 22 extends in a circumferential direction of the grommet 10, and forms an outer circumferential rim 22a and an inner circumferential rim 22b. In this construction, the distance L2 between the two channel walls 15b and 15c is set at about 1.5 mm. As the groove 22 is positioned so as to surround the second circumferential edge 21, the outer circumferential rim 22a is positioned radially outermost relative to the second channel wall 15c, while the inner circumferential rim 22b faces the second channel wall 15c. Accordingly, the inside circumferential rim 22b forms the portion closest to the second channel wall 15c, and the distance L3 therebetween is set at about 1 mm.

The first circumferential edge 20 has a flat edge 20a which abuts against one face of the panel material 2, e. g. a car's body panel, whereas the second circumferential edge 21 has an acute angle edge 21a which abuts against the other face of the panel material.

The grommet 10 is fitted on a wire harness W/H and, as shown in FIG. 6, is inserted into a hole 2a formed through a panel material 2 which has a thickness of about 1 mm. The first channel wall 15b and the second channel wall 15c of the circumferential channel 15 are then brought into close contact with the first face 2b and the second face 2c of the panel material 2 respectively. In this condition, the panel material 2 is closely pinched between the inside circumferential rim 22b of the groove 22 and the second channel wall 15c (distance: about 1 mm). Moreover, the acute angle edge 21a of second circumferential edge 21 inclining towards the panel material 2 applies a force to the panel material 2 from one side thereof, whereas the flat edge 20a of the first circumferential edge 20 inclining towards the panel material 2 applies a force to the panel material 2 from the other side thereof.

Accordingly, the panel material 2 is press-fixed at three press points: P1 where the first circumferential edge 20 presses the panel material 2 from one side, P2, where the second circumferential edge 21 presses it from the other side, and P3 where the inside circumferential rim 22b and the second channel wall 15c exert forces on both sides of the panel material 2 at about the same level of the circumferential channel 15. These three press points seal the space securely between the panel material 2 and the grommet 10. On the other hand, a die for molding the grommet 10 can maintain a minimum gap of about 1 mm, about 0.5 mm larger than the prior art dies. The dies for molding the grommets 10 of the invention thus procure a greatly improved lifetime.

Figure 7:
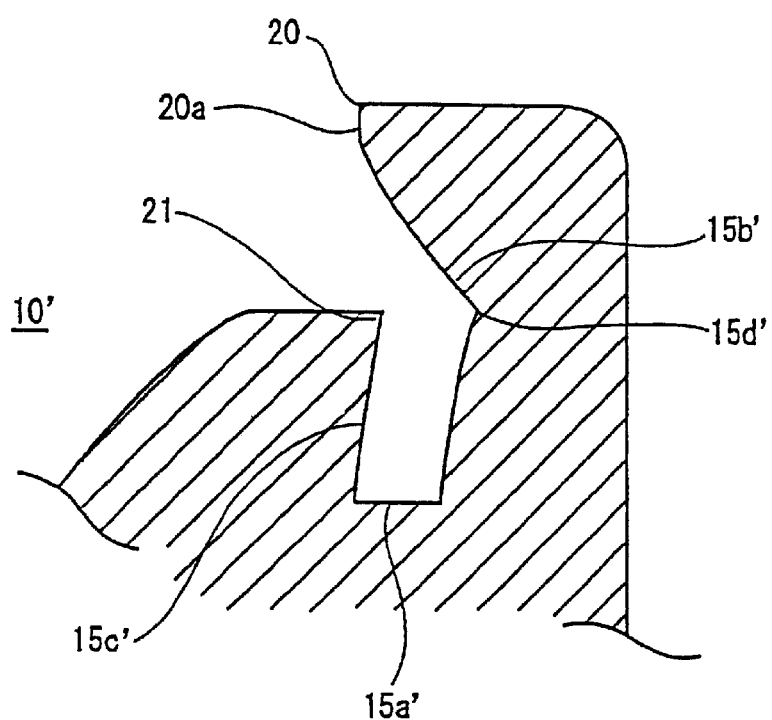
FIG. 7 is a side sectional view of a grommet according to a second embodiment of the invention.

FIG. 7 shows a variant grommet 10' according to a second embodiment of the invention. In the variant grommet 10', a variant circumferential channel 15' is defined by a first channel wall 15b', a second channel wall 15c' and a channel base 15a'. The first channel wall 15b' and the second channel wall 15c' extend outwardly in a substantially radial direction, in parallel relation to each other, up to a flexing point 15d' which is located adjacent the second circumferential edge 21. In addition, the two channel walls 15b' and 15c' are inclined towards the thick wall of the grommet 10', up to the abovementioned flexing point 15d'. The first and second channel walls 15' therefore keep a constant spaced width in this parallel structure. The first channel wall 20 inclines outwardly from the flexing point 15d' towards the second circumferential edge 21 (in a direction reverse to the thick wall), so as to form a generally hook-shaped channel section (FIG. 7).

This differs from the first embodiment, in that the first channel wall 15b' is not provided with a circumferential groove at a position facing the second circumferential edge 21. Instead, the first and second channel walls 15b' and 15c' are arranged in parallel relation to each other while inclining towards the thick wall. There is therefore no position in the circumferential channel where the space between the two channel walls becomes too close.

The other parts of the construction are the same as those of the first embodiment.

As in the first embodiment, the first circumferential edge 20 overlaps the second circumferential edge 21 in the longitudinal direction, so that both circumferential edges 20 and 21 press the panel material from both sides thereof Moreover, the flat edge 20a of the first circumferential edge 20 adheres firmly to the panel material. These two actions give a satisfactory sealing effect.

As can be understood from the above description, the grommet of the present invention is suitably applied to the thin panel of an automobile body having about 1 mm of thickness. Of course, the automobile panel, or other panel, may have any suitable thickness, and the grommet of the present invention would thus be configured with suitable dimensions to accommodate the panel thickness. The circumferential channel for hooking an automobile body panel is designed such that the two channel walls can seal the body panel without forming too narrow a space between the two channel walls. The durability of the dies for forming such grommets is thus greatly improved.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. 2000-072084, filed on Mar. 15, 2000, which is herein expressly incorporated by reference in its entirety.

What is claimed is:

1. A grommet having longitudinal and radial directions, the grommet including at least a cylindrical portion and a cylindrical end portion with a thick wall, arranged along said longitudinal direction, said grommet being configured to fit onto a wire harness and to be mounted into a substantially circumferential rim surrounding a hole bored through a panel material, said grommet comprising:

a circumferential channel on an outer cylindrical surface between said cylindrical portion and said cylindrical end portion having a thick wall, such that said circumferential channel forms a channel base and first and second channel walls extend substantially radially therefrom, said first and second channel walls respectively forming first and second circumferential edges at the radially outermost portions thereof, whereby said first circumferential edge is located radially more outwardly than said second circumferential edge;

said first and second channel walls being configured such that said first circumferential edge projects beyond said second circumferential edge in said longitudinal direction and a minimum distance between said first channel wall and said second channel wall in said longitudinal direction can be maintained above a predetermined value; and wherein said first channel wall includes a groove extending adjacent said second circumferential edge, and said first and second channel walls are configured to become closer together as they extend outwardly and substantially radially from said channel base.

2. The grommet according to claim 1, wherein said first circumferential edge comprises a flat edge in parallel relation with said radial direction, so as to hold said panel material.

3. The grommet according to claim 2, wherein said minimum distance is about 1 mm, when said panel material is about 1 mm thick.

4. The grommet according to claim 1, wherein said minimum distance is about 1 mm, when said panel material is about 1 mm thick.

5. The grommet according to claim 1, wherein said groove includes a semicircular cross-section.

6. The grommet according to claim 1, wherein said groove includes an outer circumferential rim and an inner circumferential rim, and wherein said second circumferential edge is positioned between said outer and inner circumferential rims.

7. The grommet according to claim 6, wherein said inner circumferential rim forms the portion of the first channel wall that is at said minimum distance from said second channel wall.

8. The grommet according to claim 1, wherein said second circumferential edge comprises an acute angle edge that forms an acute angle with the radial direction of said grommet.

wherein said first channel wall includes a groove extending adjacent said second circumferential edge, and said first and second channel walls are configured to become closer together as they extend outwardly and substantially radially from said channel base.

9. A grommet having longitudinal and radial directions, the grommet including at least a cylindrical portion and a cylindrical end portion with a thick wall, arranged along said longitudinal direction, said grommet being configured to fit onto a wire harness and to be mounted into a substantially circumferential rim surrounding a hole bored through a panel material, said grommet comprising:

a circumferential channel on an outer cylindrical surface between said cylindrical portion and said cylindrical end portion having a thick wall, such that said circumferential channel forms a channel base and first and second channel walls extend substantially radially therefrom, said first and second channel walls respectively forming first and second circumferential edges at the radially outermost portions thereof, whereby said first circumferential edge is located radially more outwardly than said second circumferential edge;

said first and second channel walls being configured such that said first circumferential edge projects beyond said second circumferential edge in said longitudinal direction and a minimum distance between said first channel wall and said second channel wall in said longitudinal direction can be maintained above a predetermined value; and wherein said first and second channel walls are configured such that said first channel wall is bent at a flex point near said second circumferential edge, whereby said first channel wall extends, up to said flex point, in parallel relation to said second channel wall while inclining towards said cylindrical end portion in said longitudinal direction, and said first channel wall then inclines towards said second circumferential edge from said flex point radially outward.

10. The grommet according to claim 9, wherein said first circumferential edge comprises a flat edge in parallel relation with said radial direction, so as to hold said panel material.

11. The grommet according to claim 10, wherein said minimum distance is about 1 mm, when said panel material is about 1 mm thick.

12. The grommet according to claim 9, wherein said minimum distance is about 1 mm, when said panel material is about 1 mm thick.

13. The grommet according to claim 9, wherein said second circumferential edge comprises an acute angle edge that forms an acute angle with the radial direction of said grommet.

14. A grommet having longitudinal and radial directions, the grommet including at least a cylindrical portion and a cylindrical end portion with a thick wall, arranged along said longitudinal direction, said grommet being configured to fit onto a wire harness and to be mounted into a substantially circumferential rim surrounding a hole bored through a panel material, said grommet comprising:

a circumferential channel on an outer cylindrical surface between said cylindrical portion and said cylindrical end portion having a thick wall, such that said circumferential channel forms a channel base and first and second channel walls extend substantially radially therefrom, said first and second channel walls respectively forming first and second circumferential edges at the radially outermost portions thereof, whereby said first circumferential edge is located radially more outwardly than said second circumferential edge;

said first and second channel walls being configured such that said first circumferential edge projects beyond said second circumferential edge in said longitudinal direction and a minimum distance between said first channel wall and said second channel wall in said longitudinal direction can be maintained above a predetermined value; and wherein said second circumferential edge comprises an acute angle edge that forms an acute angle with the radial direction of said grommet.

* * * * *

UNITED STATES PATENT AND TRADEMARK OFFICE
CERTIFICATE OF CORRECTION

PATENT NO.     : 6,541,703 B2
DATED          : April 1, 2003
INVENTOR(S)    : H. Nakata It is certified that error appears in the above-identified patent and that said Letters Patent is hereby corrected as shown below:

Column 6,
Lines 42-46, delete "wherein said first channel wall includes a groove extending adjacent said second circumferential edge, and said first and second channel walls are configured to become closer together as they extend outwardly and substantially radially from said channel base".

Signed and Sealed this

Tenth Day of February, 2004

JON W. DUDAS
*Acting Director of the United States Patent and Trademark Office*